United States Patent
Tu et al.

(10) Patent No.: US 9,952,089 B2
(45) Date of Patent: Apr. 24, 2018

(54) OPTICAL SENSING MODULE AND METHOD OF MANUFACTURING THE SAME

(71) Applicant: Lingsen Precision Industries, Ltd., Taichung (TW)

(72) Inventors: Ming-Te Tu, Taichung (TW); Yu-Chang Huang, Taichung (TW)

(73) Assignee: Lingsen Precision Industries, Ltd., Taichung (TW)

( * ) Notice: Subject to any disclaimer, the term of this patent is extended or adjusted under 35 U.S.C. 154(b) by 0 days.

(21) Appl. No.: 14/536,210

(22) Filed: Nov. 7, 2014

(65) Prior Publication Data

US 2016/0091364 A1  Mar. 31, 2016

(30) Foreign Application Priority Data

Sep. 30, 2014  (TW) .............................. 103133888 A

(51) Int. Cl.
| | |
|---|---|
| H01J 40/14 | (2006.01) |
| G01J 1/02 | (2006.01) |
| G01J 1/42 | (2006.01) |
| G01S 17/02 | (2006.01) |
| G01S 7/481 | (2006.01) |

(52) U.S. Cl.
CPC .......... G01J 1/0271 (2013.01); G01J 1/0209 (2013.01); G01J 1/0233 (2013.01); G01J 1/42 (2013.01); G01S 7/4813 (2013.01); G01S 7/4815 (2013.01); G01S 17/026 (2013.01)

(58) Field of Classification Search
CPC ............... G01J 1/0271; H03K 17/943; H03K 2217/94111
USPC ........................................ 250/221, 551, 239
See application file for complete search history.

(56) References Cited

U.S. PATENT DOCUMENTS

| | | | | |
|---|---|---|---|---|
| 2006/0226336 A1* | 10/2006 | York | .......................... | G01J 1/02 250/206 |
| 2011/0182065 A1* | 7/2011 | Negley | ..................... | F21K 9/00 362/231 |
| 2013/0010310 A1* | 1/2013 | Wong | ................... | H03K 17/943 356/623 |

* cited by examiner

*Primary Examiner* — Thanh Luu
(74) *Attorney, Agent, or Firm* — Muncy, Geissler, Olds & Lowe, P.C.

(57) ABSTRACT

An optical sensing module includes a substrate, a cover, a plurality of light-emitting chips, a light-receiving chip, and a plurality of encapsulants. The cover is disposed on the substrate. A plurality of first chambers and a second chamber are formed between the cover and the substrate. The cover has a plurality of light-emitting holes communicating with the first chambers, respectively, and a light-receiving hole communicating with the second chamber. The light-emitting chips are disposed on the substrate and in the first chambers, respectively. The light-receiving chip is disposed on the substrate and in the second chamber. The encapsulants fill the first and second chambers and enclose the light-emitting chips and the light-receiving chip, respectively. Hence, characterized in that: the light-emitting chips and the light-receiving chip are disposed on the substrate, and the light-emitting chips emit light beams in different colors to enhance light emission efficiency.

6 Claims, 4 Drawing Sheets

OPTICAL SENSING MODULE AND METHOD OF MANUFACTURING THE SAME

BACKGROUND OF THE INVENTION

1. Field of the Invention

The present invention relates to optical sensing modules, and more particularly, to an optical sensing module and a method of manufacturing the optical sensing module.

2. Description of Related Art

Conventional handheld electronic devices, such as smartphones, are each equipped with an optical sensing module for preventing an inadvertent touch of touch panels or saving power. A light-emitting chip of the optical sensing module emits a light beam as soon as the handheld electronic device approaches the surface of an object, such as the cheek of a human being. After being reflected off the surface of the object, the light beam is received by a light-receiving chip of the optical sensing module. Finally, the optical sensing module converts the received light beam into an electrical signal to be processed.

Since the conventional optical sensing modules are each equipped with a single light-emitting chip and a single light-receiving chip, the manufacturing process of the conventional optical sensing modules requires packaging the single light-emitting chip and the single light-receiving chip separately and then integrating the two, to the detriment of light emission efficiency. As a result, results of a subsequent procedure of reading of the electrical signal are unreliable.

SUMMARY OF THE INVENTION

It is an objective of the present invention to provide an optical sensing module conducive to enhancement of light emission efficiency and thus stabilization of signals.

In order to achieve the above and other objectives, the present invention provides an optical sensing module which comprises a substrate, a cover, a plurality of light-emitting chips, a light-receiving chip, and a plurality of encapsulants. The cover is disposed on the substrate. A plurality of first chambers and a second chamber are disposed between the cover and the substrate. The cover has a plurality of light-emitting holes and a light-receiving hole. The light-emitting holes are in communication with the first chambers, respectively. The light-receiving hole is in communication with the second chamber. The plurality of light-emitting chips is disposed on the substrate and in the first chambers, respectively, to emit light beams in different colors. The light-receiving chip is disposed on the substrate and in the second chamber to convert the received light beams into electrical signals to be processed. The plurality of encapsulants fill the first and second chambers, respectively, and enclose the light-emitting chips and the light-receiving chip, respectively, so as to provide insulating protection to the light-emitting chips and the light-receiving chip. Hence, according to the present invention, the optical sensing module is characterized in that: the light-emitting chips and the light-receiving chip are disposed on the same substrate, wherein the light-emitting chips emit light beams in different colors and thus enhance light emission efficiency.

In an embodiment of the present invention, the width of the cross-section of each said first chamber increases gradually away from the substrate, and the surfaces of the first chambers are coated with a metal reflecting layer, so as to enhance the efficiency of light emission of the light-emitting chips.

Another objective of the present invention is to provide a method of manufacturing the optical sensing module. The method comprises the steps of: mounting a plurality of light-emitting chips and a light-receiving chip on a substrate by wire bonding; fixing the cover to the substrate, such that the light-emitting chips and the light-receiving chip are received in the first and second chambers, respectively; and introducing the encapsulants into the first chambers and the second chamber through the light-emitting holes of the cover and the light-receiving hole of the cover, respectively, such that the encapsulants enclose the light-emitting chips and the light-receiving chip, respectively. Hence, the optical sensing module manufactured by the manufacturing method of the present invention manifests satisfactory light emission efficiency to thereby ensure signal stability.

DETAILED DESCRIPTION OF THE EMBODIMENT OF THE INVENTION

Figure 1:
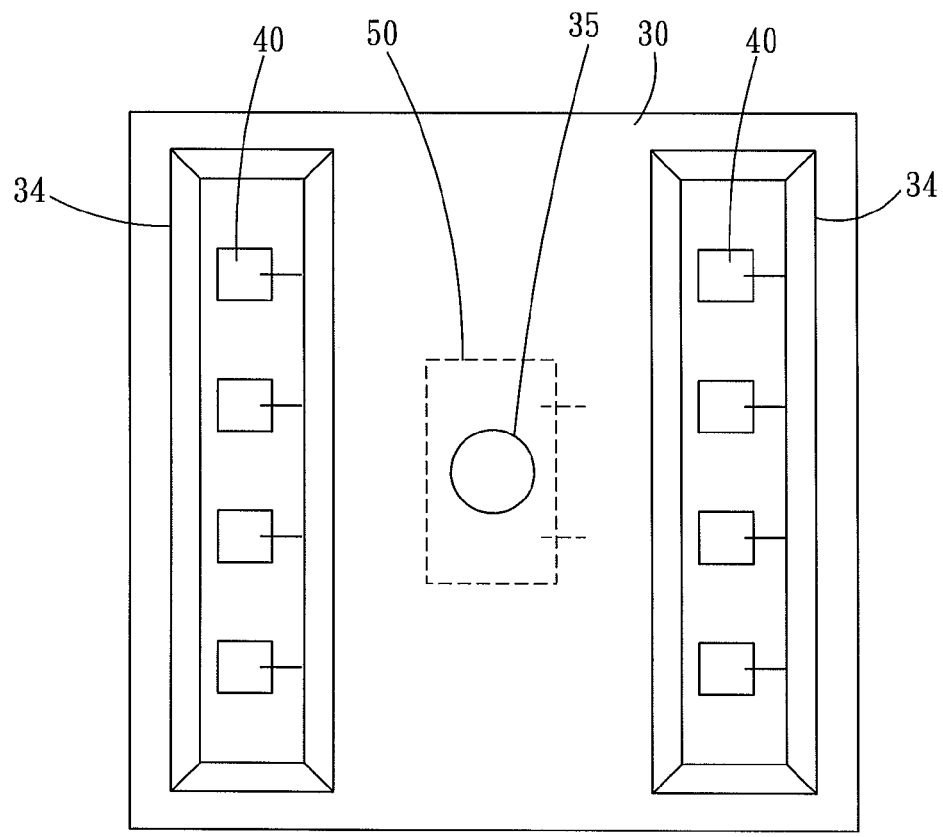
FIG. 1 is a top view of the first embodiment of the present invention.
Figure 2:
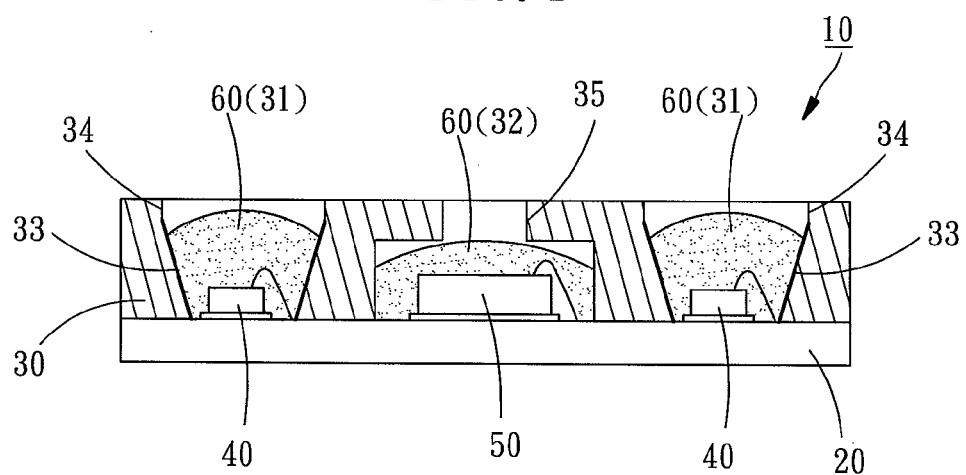
FIG. 2 is a cross-sectional view of the present invention.

Referring to FIG. 1 and FIG. 2, according to the first embodiment of the present invention, an optical sensing module 10 comprises a substrate 20, a cover 30, a plurality of light-emitting chips 40, a light-receiving chip 50, and a plurality of encapsulants 60. The light-emitting chips 40 are in the number of eight, for example.

The substrate 20 is made of BT resin or FR-4 fiberglass, but the present invention is not limited thereto.

Figure 3:
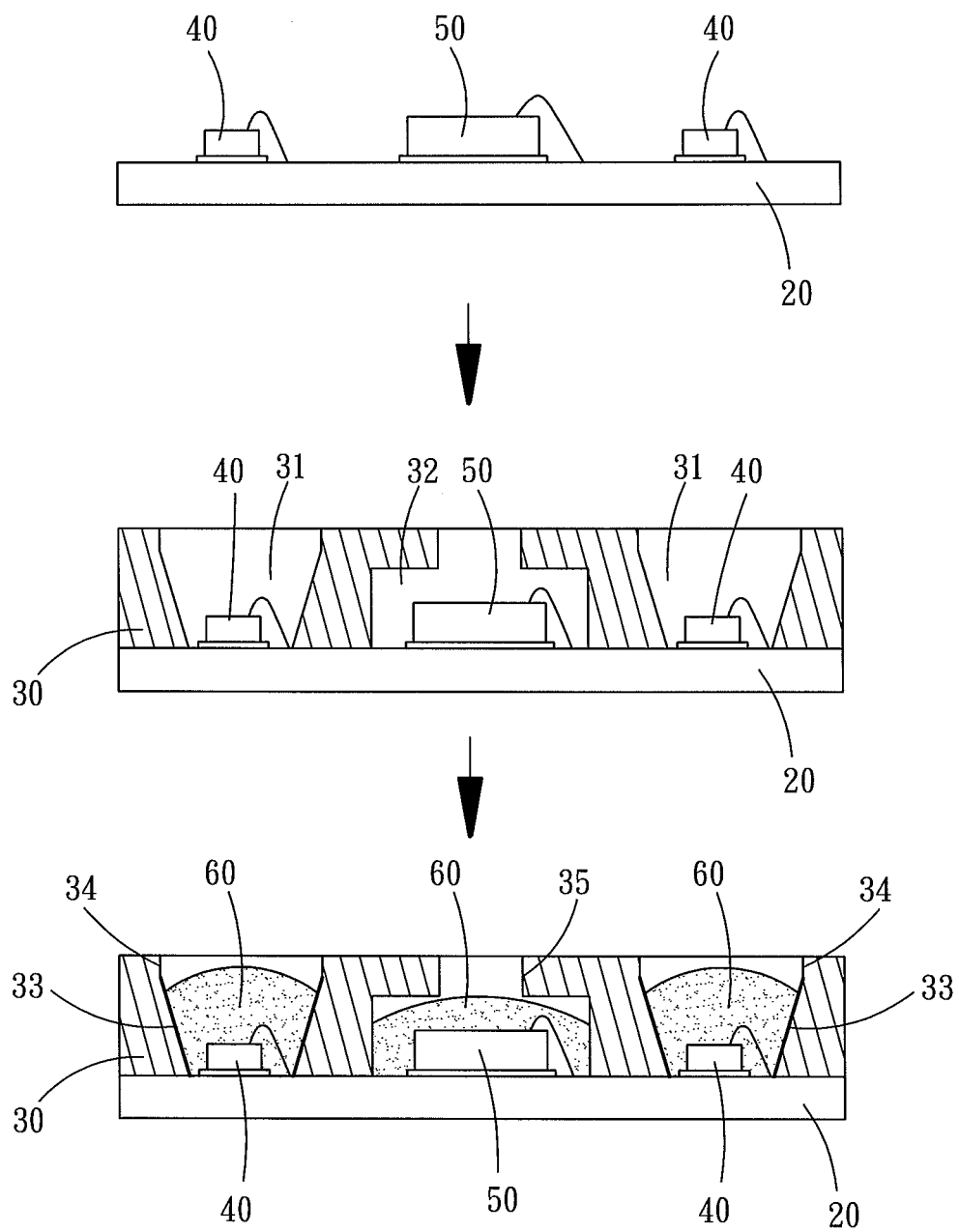
FIG. 3 is a flowchart of a manufacturing method of the present invention.

In this embodiment, the cover 30 is fixed to the substrate 20. Two opposing first chambers 31 and a second chamber 32 are formed between the cover 30 and the substrate 20. The two first chambers 31 are disposed on two opposing sides of the second chamber 32, respectively. Referring to FIG. 3, the width of the cross-section of each first chamber 31 increases gradually away from the substrate 20, and the first chambers 31 are each coated with a metal reflecting layer 33. In this embodiment, the cover 30 has two light-emitting holes 34 and a light-receiving hole 35. The light-emitting holes 34 are in communication with the first chambers 31, respectively, and the light-receiving hole 35 is in communication with the second chamber 32.

In this embodiment, the light-emitting chips 40 are disposed on the substrate 20. The light-emitting chips 40 disposed in the first chambers 31 are paired in a manner that each first chamber 31 contains four light-emitting chips 40 for emitting light beams in different colors, such as red, green, blue, and white.

The light-receiving chip 50 is disposed on the substrate 20 and in the second chamber 32 and adapted to receive light beams reflected.

The encapsulants 60 are introduced into the first and second chambers 31, 32 through the light-emitting holes 34 of the cover 30 and the light-receiving hole 35 of the cover 30, respectively, to fill the first and second chambers 31, 32, respectively, and enclose the light-emitting chips 40 and the light-receiving chip 50, respectively, so as to provide insulating protection to the light-emitting chips 40 and the light-receiving chip 50.

The structure of the optical sensing module 10 of the present invention is described in detail above. A method of manufacturing the optical sensing module 10 according to the present invention is illustrated with FIG. 3 and described below.

The optical sensing module 10 undergoes a packaging process described below. The light-emitting chips 40 and the light-receiving chip 50 are mounted on the substrate 20 by wire bonding. Then, the cover 30 is fixed to the substrate 20 by ultrasonic welding, such that the light-emitting chips 40 and the light-receiving chip 50 are received in the first and second chambers 31, 32 formed between the cover 30 and the substrate 20, respectively. Afterward, the wall of each first chamber 31 is coated with a metal reflecting layer 33 by sputtering. Finally, the encapsulants 60 are introduced into the first and second chambers 31, 32, respectively, through the light-emitting holes 34 of the cover 30 and the light-receiving hole 35 of the cover 35, respectively, to fill the first and second chambers 31, 32, respectively, and thus enclose the light-emitting chips 40 and the light-receiving chip 50, respectively, thereby finalizing the process of packaging the optical sensing module 10. The aforesaid packaging process is followed by a process of cutting the packaged optical sensing module 10. The cutting process is attributed to the prior art and thus is not described herein for the sake of brevity.

In practice, light beams emitted from the light-emitting chips 40 pass through the light-emitting holes 34 of the cover 30 to fall on a surface of an object. Then, the light beams which are reflected off the surface of the object pass through the light-receiving hole 35 of the cover 30 to fall on the light-receiving chip 50, such that the light-receiving chip 50 converts the received light beams into electrical signals to be processed. Due to the special shapes of the first chambers 31 and the configuration of the metal reflecting layer 33, even if the light beams emitted from the light-emitting chips 40 fall on an uneven surface of an object, such as the cheek of a human being, the light-receiving chip 50 will receive the reflected light beams precisely to therefore enhance light emission efficiency and ensure signal stability.

Figure 4:
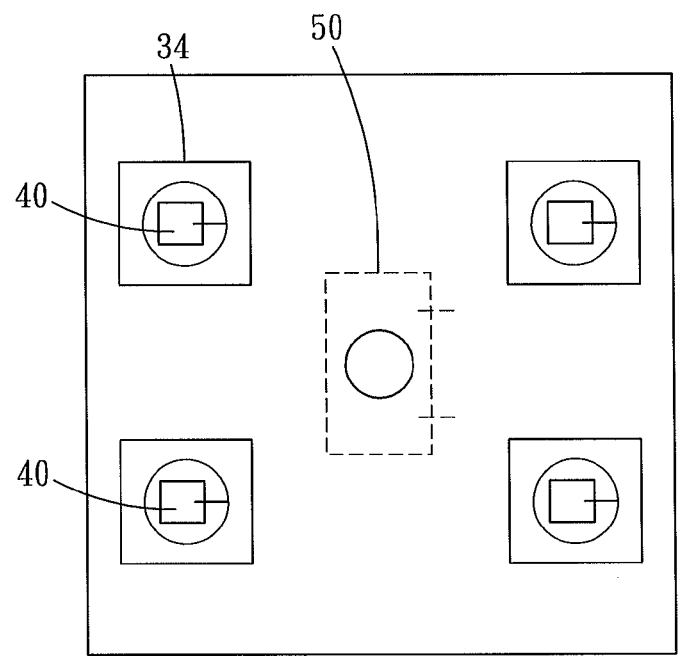
FIG. 4 is a top view of the second embodiment of the present invention.
Figure 5:
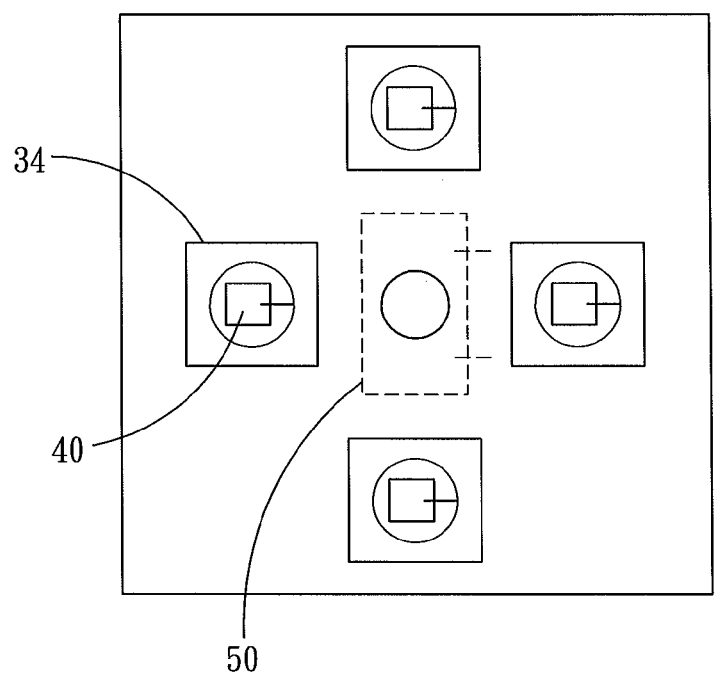
FIG. 5 is a top view of the third embodiment of the present invention.
Figure 6:
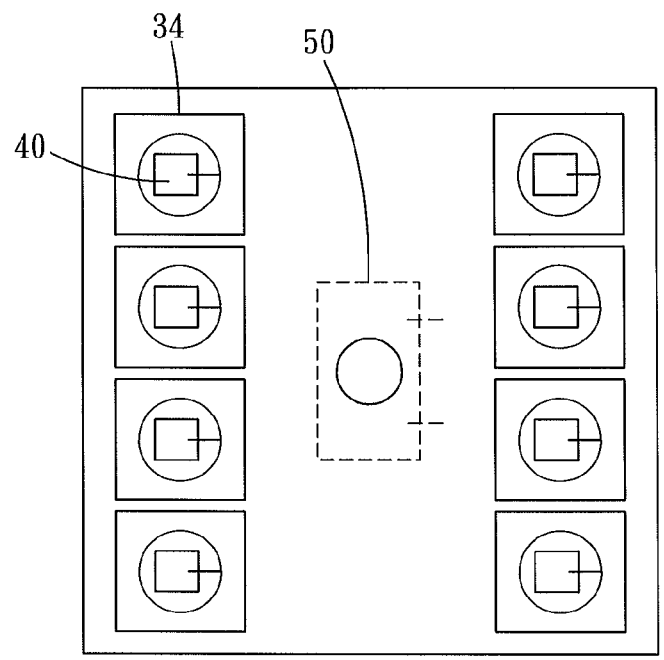
FIG. 6 is a top view of the fourth embodiment of the present invention.
Figure 7:
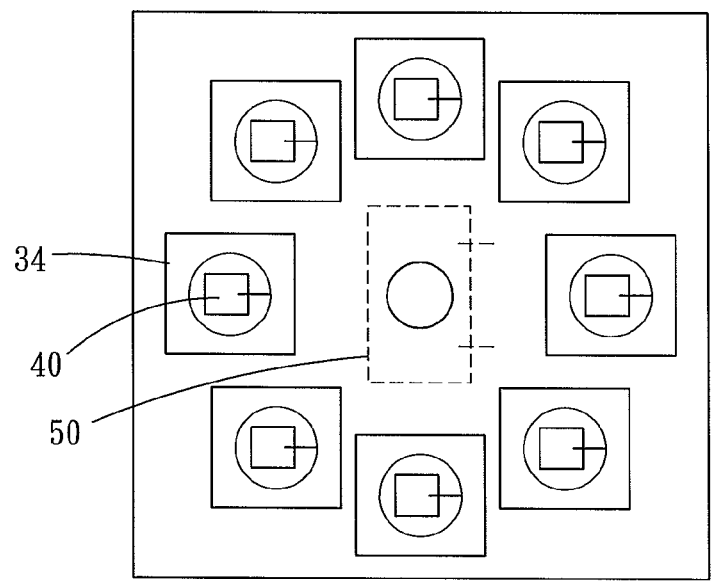
FIG. 7 is a top view of the fifth embodiment of the present invention.

The quantity and arrangement of the light-emitting chips 40 is subject to changes as needed. In the second and third embodiments, the light-emitting chips 40 are in the number of four and arranged in rectangular (as shown in FIG. 4) or rhomboid (as shown in FIG. 5) configuration centered at the light-receiving chip 50. In the second and third embodiments, to get in line with the configuration of the light-emitting chips 40, the first chambers 31 and the light-emitting holes 34 are in the number of four, such that the first chambers 31 are in communication with the light-emitting holes 34, respectively, whereas the first chambers 31 each contain a corresponding one of the light-emitting chips 40. In the fourth and fifth embodiments, the light-emitting chips 40 are in the number of eight. The fourth embodiment differs from the fifth embodiment in that: in the fourth embodiment, the light-emitting chips 40 are paired and disposed on two opposing sides of the light-receiving chip 50 (as shown in FIG. 6) in a manner that four light-emitting chips 40 are disposed on each of the two opposing sides of the light-receiving chip 50; and, in the fifth embodiment, the light-emitting chips 40 are arranged in annular configuration centered at the light-receiving chip 50 (as shown in FIG. 7). Likewise, in the fourth and fifth embodiments, to get in line with the configuration of the light-emitting chips 40, the first chambers 31 and the light-emitting holes 34 are in the number of eight, such that the first chambers 31 are in communication with the light-emitting holes 34, respectively, whereas the first chambers 31 each contain a corresponding one of the light-emitting chips 40.

In conclusion, according to the present invention, the optical sensing module 10 is characterized in that: the light-emitting chips 40 and the light-receiving chip 50 are disposed on the substrate 20, wherein the light-emitting chips 40 are subject to changes in terms of quantity and arrangement so as to emit light beam in different colors, enhance light emission efficiency, and ensure signal stability.

What is claimed is:

1. An optical sensing module, comprising:
   a substrate;
   a cover disposed on the substrate and having a plurality of light-emitting holes and a light-receiving hole, wherein a plurality of first chambers and a second chamber are disposed between the cover and the substrate, allowing the light-emitting holes to communicate with the first chambers, respectively, and the light-receiving hole to communicate with the second chamber;
   a plurality of light-emitting chips disposed on the substrate and in the first chambers, respectively; wherein the light-emitting chips emit light beams in different colors comprising red, green, blue, and white;
   a light-receiving chip disposed on the substrate and in the second chamber and adapted to receive all the different light beams reflected; and
   a plurality of encapsulants introduced into the first and second chambers, respectively, to enclose the light-emitting chips and the light-receiving chip, respectively,
   wherein the first chambers form first and second sets of four first chambers, wherein the light-emitting chips form first and second sets of four light-emitting chips, in communication with the first and second sets of the first chambers, respectively, paired, and the respective four light-emitting chips of the first and second sets are each linearly disposed on two opposing sides of the light-receiving chip and in parallel with each other, and wherein the light-emitting holes are in the number of eight and in communication with the first chambers, respectively.

2. The optical sensing module of claim 1, wherein a width of a cross-section of each said first chamber increases gradually away from the substrate.

3. The optical sensing module of claim 1, wherein a width of a cross-section of each said first chamber increases gradually away from the substrate.

4. The optical sensing module of claim 3, wherein a wall of each said first chamber is coated with a metal reflecting layer.

5. A method of manufacturing the optical sensing module of claim 1, the method comprising the steps of:
   a) mounting a plurality of light-emitting chips and a light-receiving chip on a substrate; wherein the light-emitting chips emit light beams in different colors comprising red, green, blue, and white, and the light-receiving chip is adapted to receive all the different light beams reflected;

b) mounting a cover on the substrate to allow the light-emitting chips to be received in first chambers formed between the cover and the substrate, respectively, wherein the first chambers are in communication with light-emitting holes of the cover, respectively, and the light-receiving chip is received in a second chamber formed between the cover and the substrate, wherein the second chamber is in communication with a light-receiving hole of the cover; and c) introducing a plurality of encapsulants into the first chambers and the second chamber, respectively, through the light-emitting holes of the cover and the light-receiving hole of the cover, respectively, such that the plurality of encapsulants enclose the light-emitting chips and the light-receiving chip, respectively, wherein the first chambers form first and second sets of four first chambers wherein the light-emitting chips form first and second sets of four light-emitting chips, in communication with the first and second sets of the first chambers, respectively, paired, and the respective four light-emitting chips of the first and second sets are each linearly disposed on two opposing sides of the light-receiving chip and in parallel with each other, and wherein the light-emitting holes are in the number of eight and in communication with the first chambers, respectively.

6. The method of claim 5, wherein, in step c), a wall of each said first chamber is coated with a metal reflecting layer before introducing the plurality of encapsulants.

\* \* \* \* \*